J. C. H. STUT.
Feathering Paddle-Wheels.
No. 134,326. Patented Dec. 24, 1872.
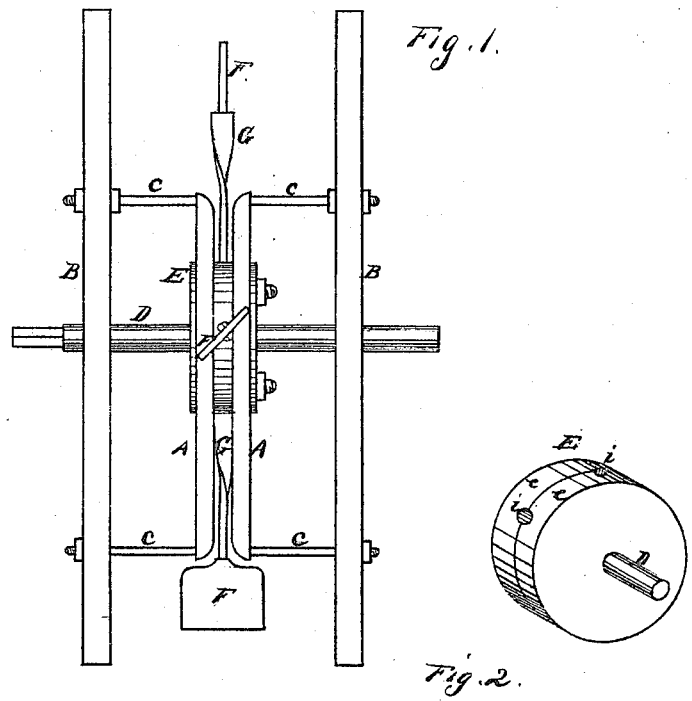
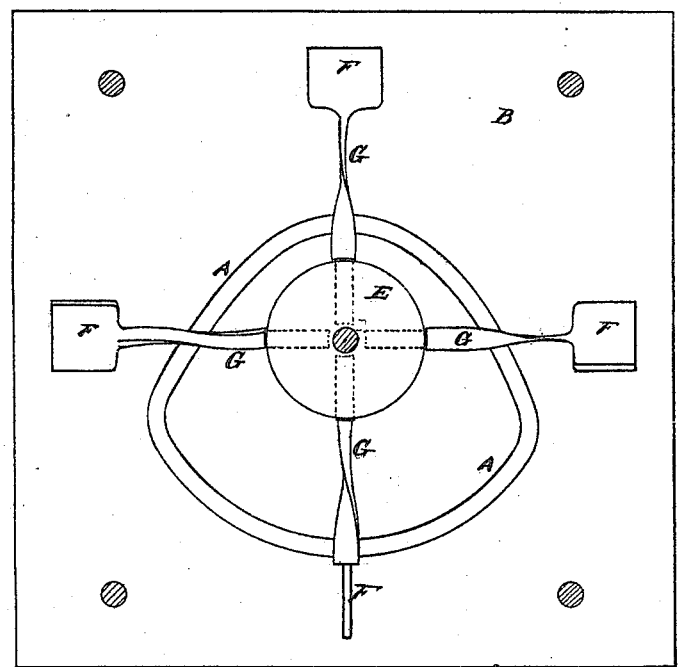
Witnesses
John L. Boone
C. N. Richardson
John C. H. Stut
per Dewey & Co
Attys

UNITED STATES PATENT OFFICE.

JOHN C. H. STUT, OF SAN FRANCISCO, CALIFORNIA.

IMPROVEMENT IN FEATHERING PADDLE-WHEELS.

Specification forming part of Letters Patent No. 134,326, dated December 24, 1872.

*To all whom it may concern:*

Be it known that I, JOHN CH. HENRY STUT, of San Francisco city and county, State of California, have invented an Improved Paddle-Wheel; and I do hereby declare the following description and accompanying drawing are sufficient to enable any person skilled in the art or science to which it most nearly appertains to make and use my said invention or improvement without further invention or experiment.

My invention relates to an improvement in the construction of paddle-wheels, by which the paddles are feathered as they enter and leave the water, thus avoiding the pound and lift which are occasioned by the paddles of an ordinary paddle-wheel with horizontal fixed buckets.

In order to explain my invention so that others will understand its nature and operation, reference is had to the accompanying drawing forming a part of this specification, in which—

Figure 1 is an end view, and Fig. 2 is a transverse section through the shaft, and showing one of the cams.

A A are two cam-shaped metal rings, which are properly supported in a vertical position at a short distance apart. These rings are both elliptic in form, and are so placed that their greatest diameter lies in a horizontal plane. In the present instance these rings are represented as supported between two upright surfaces, B B, by means of rods *c c*, so that a clear space will be left between the two rings. The wheel-shaft D passes through the center of the rings, and has the hub E secured upon it inside of the rings. The hub consists of two disks or wheels, *e e*, which are secured together by means of bolts. The inner or meeting faces of these disks are provided with corresponding radial semicircular grooves, which form, when the two disks are bolted together, round holes *i*, which radiate from the center of the hub. The paddles or buckets F F are carried at the outer extremity of the arms or spokes G G. These spokes or arms are constructed with a twist in the manner of an auger, and are set in the holes *i* in the hub so that they can revolve freely. The spirally-twisted arms or spokes pass out between the two elliptic rings A A, and the rings are close enough together to allow the arms to move between them only when their flat sides are parallel with the faces of the rings.

Thus it will be seen that, as the rings gradually recede from the center, the nearer they approach to a horizontal line on each side of the shaft the bearing of the arms between the rings will be continually shifting its position to or from the hub as the arms are revolved with the shafts; and, as the rings continually keep the portion of the spokes or arms which is between them in the same direction, it is plain that the arms and paddles will be given a half revolution every time that they pass from a horizontal line on one side of the hub to a horizontal line on the opposite side, thus feathering the paddles as they enter the water on one side and leave it on the opposite side.

By this means I provide a strong and substantial feathering paddle-wheel.

Having thus described my invention, what I claim, and desire to secure by Letters Patent, is—

The loosely-revolving arms or spokes G G, twisted spirally, and having the paddles F F at their outer ends, in combination with the corresponding elliptical rings A A, all constructed, arranged, and operated substantially as and for the purpose above described.

In witness whereof I hereunto set my hand and seal.

JOHN CHRISTIAN HENRY STUT. [L. S.]

Witnesses:
J. L. BOONE,
C. M. RICHARDSON.